No. 618,884. Patented Feb. 7, 1899.
F. LAMPHERE.
COLTER CLEANING DEVICE.
(Application filed Jan. 10, 1898.)

(No Model.)

WITNESSES
Horace R. Wheeler,
O. B. Baringer.

INVENTOR
Franklin Lamphere,
By R. B. Wheeler + Co.
Attorneys.

THE NORRIS PETERS CO., PHOTO-LITHO., WASHINGTON, D. C.

UNITED STATES PATENT OFFICE.

FRANKLIN LAMPHERE, OF ARMADA, MICHIGAN, ASSIGNOR OF ONE-HALF TO EDDIE A. HULETT, OF SAME PLACE.

COLTER-CLEANING DEVICE.

SPECIFICATION forming part of Letters Patent No. 618,884, dated February 7, 1899.

Application filed January 10, 1898. Serial No. 666,128. (No model.)

*To all whom it may concern:*

Be it known that I, FRANKLIN LAMPHERE, a citizen of the United States, residing at Armada, in the county of Macomb, State of Michigan, have invented certain new and useful Improvements in Colter-Cleaning Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improved colter-cleaning device for cleaning plows; and it consists in the construction and arrangement of parts, as hereinafter fully set forth, and pointed out particularly in the claims.

The object of the invention is to provide simple and effective means for removing any accumulation of grass, weeds, or dirt from the blade of the colter without stepping in front of the plow, enabling the operator to clean the colter without leaving his position at the plow-handles. This object is attained by the mechanism illustrated in the accompanying drawings, in which—

Figure 1:
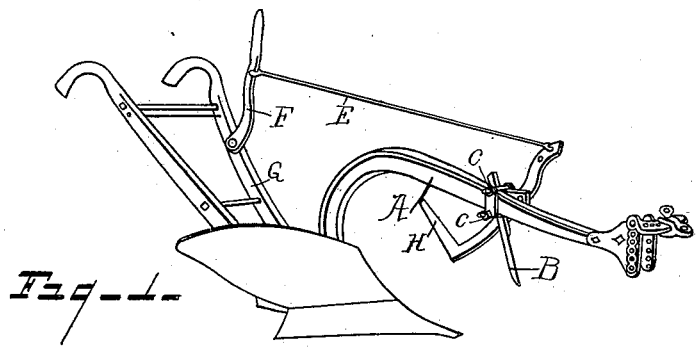
Figure 2:
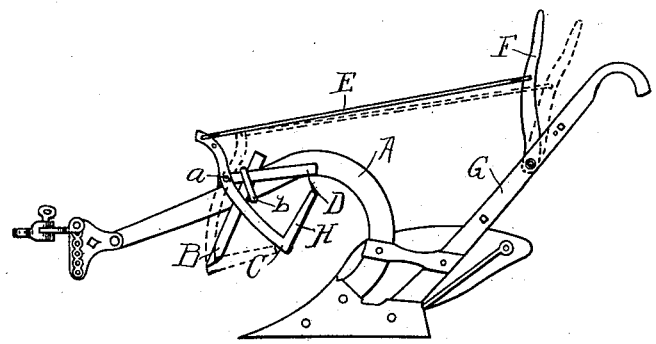
Figure 3:
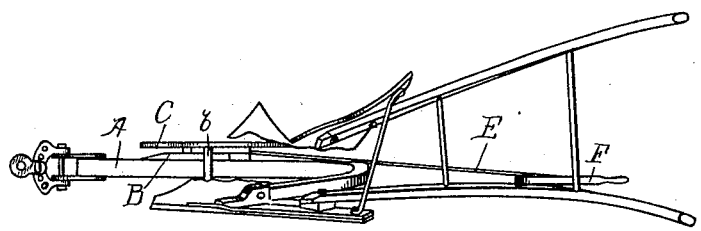

Figure 1 is a perspective of a plow provided with my improved colter-cleaning device. Fig. 2 is a side elevation of same. Fig. 3 is an inverted plan with part of the plow-point and moldboard broken away, showing the relative position of parts.

Referring to the letters of reference, A designates the plow-beam, which may be of ordinary construction.

B designates the colter knife or blade, which is adjustably secured to said beam by means of an embracing clip or clevis $b$.

C designates the colter-cleaning arm, which is pivoted at $a$ to a bar D, which passes through and is secured in place by the clevis $b$. Attached to the upper end of the arm C is a connecting-rod E, which is also connected with a lever F, pivoted to the plow-handle G.

The colter-cleaning arm C is curved, as shown, and normally stands rearward of the colter, which inclines downward and forward at a suitable angle to properly cut the sod or ground in advance of the plow. Should there be an accumulation of grass or weeds form upon the blade of the colter, so as to prevent the effective operation thereof, the plow is stopped and the lever F actuated, so as to cause the arm C to shear forward past the colter, thereby removing all obstructions therefrom, as shown by dotted lines in Fig. 2. The lever is then thrown forward to return said parts to their normal position, as shown by solid lines in Figs. 1 and 2, in which position said parts remain until another operation of cleaning the colter is necessary.

Formed integral with the free end of the arm C and projecting rearwardly at an angle thereto is a guard H, which stands adjacent to the colter when the arm C is thrown forward, so as to cover the end thereof and prevent the entrance of grass or weeds between the arm and colter as said arm moves forward past the colter-blade, thereby avoiding the clogging of said arm and insuring its free return after being actuated to clear the colter.

By the employment of the clevis $b$, which embraces and confines the colter B and the bar D, to which the arm C is pivoted, properly in place, said colter is made readily adjustable as to the depth and angle thereof, and the arm C is made likewise adjustable with respect thereto through the fact that this arrangement makes possible and easy the longitudinal movement of the bar D. When said parts shall have been properly set, they are at once clamped in position by tightening the nuts $c$, so as to clamp said parts and the clevis to the beam.

It will now be understood that this device is very simple, effective, and inexpensive and that it may be readily attached to any plow-beam, enabling the operator to keep the colter clean without the necessity of going in front of the plow and removing by hand the obstructions by which the colter may have become clogged.

Having thus fully set forth my invention, what I claim as new, and desire to secure by Letters Patent, is—

1. In a colter-cleaning device, the combination with the plow-beam, the adjustable colter-blade, the clamp embracing said blade and beam, a bar also embraced by said clamp, the cleaning-arm pivoted to the projecting end of said bar, and the lever for actuating said arm.

2. In a colter-cleaning device, the combination with a plow-beam, the colter, the pivoted arm mounted on the plow-beam so as to shear by the colter, said arm having a guard extending rearwardly at right angles thereto, and means for actuating said arm.

In testimony whereof I affix my signature in presence of two witnesses.

FRANKLIN LAMPHERE.

Witnesses:
 E. A. HULETT,
 E. S. WHEELER.